Jan. 24, 1956
G. W. AGNEW
2,731,852
ELECTRICALLY CONTROLLED PEDAL LOCK
Filed Jan. 16, 1953
2 Sheets-Sheet 1
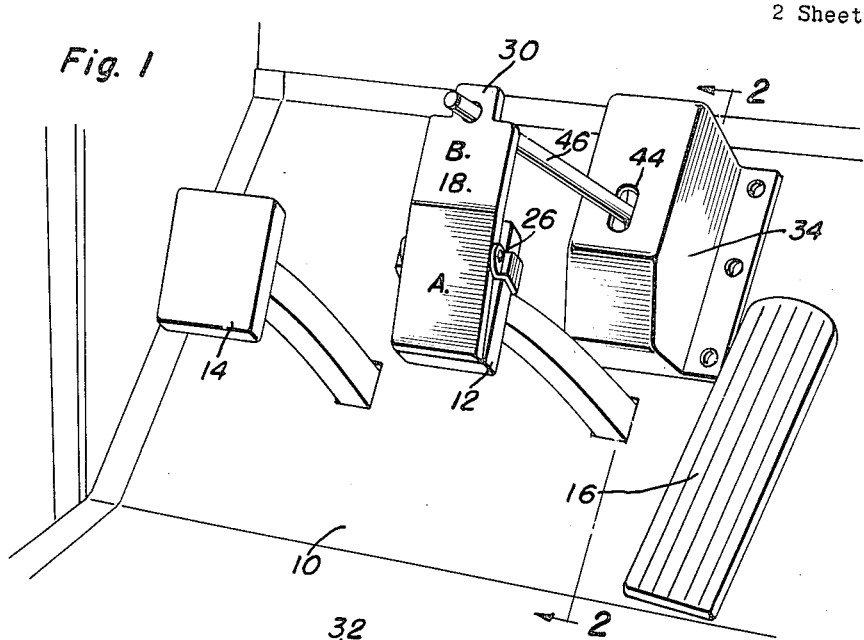
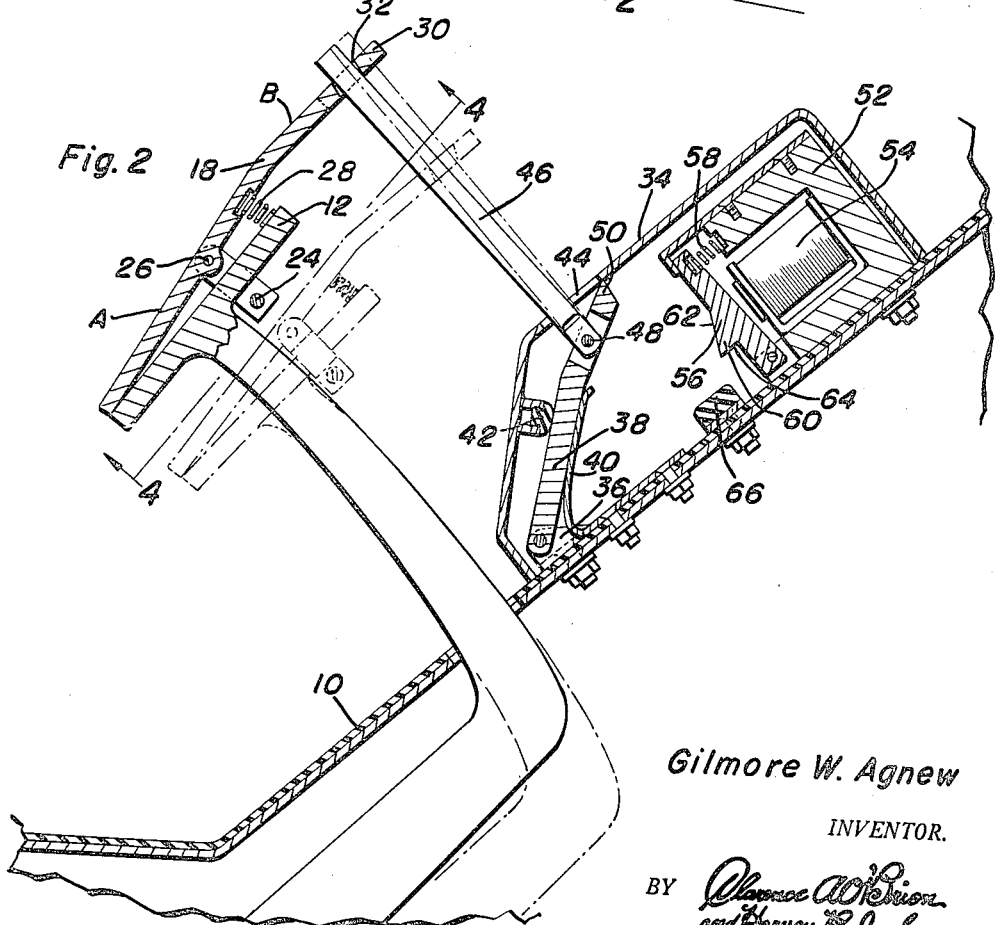
Gilmore W. Agnew
INVENTOR.
BY *Clarence A. O'Brien*
*and Harvey B. Jacobson*
Attorneys Jan. 24, 1956
G. W. AGNEW
2,731,852
ELECTRICALLY CONTROLLED PEDAL LOCK
Filed Jan. 16, 1953
2 Sheets-Sheet 2
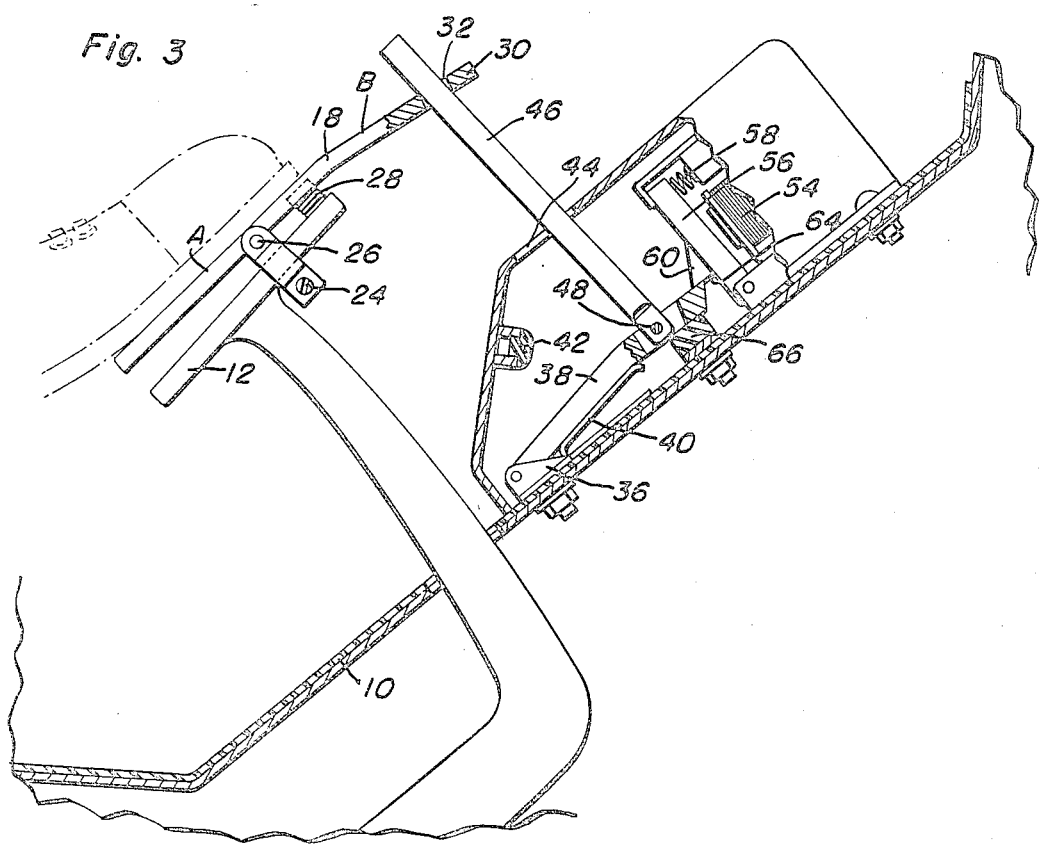
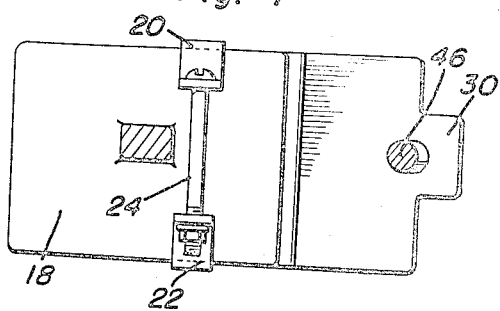
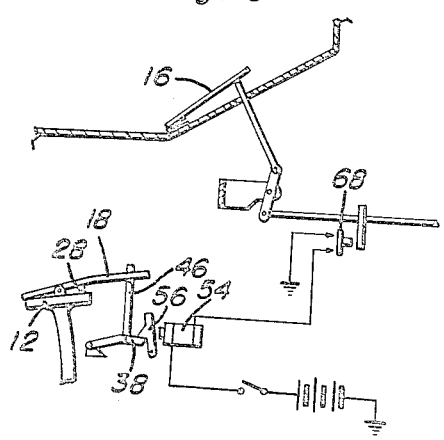
Gilmore W. Agnew
INVENTOR.

United States Patent Office 2,731,852
Patented Jan. 24, 1956

2,731,852
ELECTRICALLY CONTROLLED PEDAL LOCK
Gilmore W. Agnew, San Diego, Calif.
Application January 16, 1953, Serial No. 331,705
5 Claims. (Cl. 74—539)

This invention relates to an attachment for conventional hydraulic brakes as used in automotive vehicles and more particularly to a device adapted for use in retaining the hydraulic brakes in a locked and applied position without requiring continuous pressure from an operator's foot on the brake pedal.

A particular object and advantage of this invention is to prevent a car from rolling backwardly or forwardly when the car is on an incline while still eliminating the need for the use of the hand brake or for the continuous application of pressure on the foot actuated brake pedal.

Other advantages resulting from the use of this hill holder reside in the convenience resulting from proper application of this invention when starting and manipulating a vehicle on hills, while increasing the safety of motor vehicle operation by reducing the possibility of undesired backward or forward rolling of the vehicle when driving in traffic on hilly terrain.

Still further objects and features of the invention reside in the provision of a hill holder that is strong and durable, capable of being applied to various existing and conventional makes and models of automobiles, which is simple in construction and attachment and which may be readily produced at relatively low cost for wide distribution in the automotive trade.

These, together with the various ancillary objects of the invention which will become apparent as the following description proceeds, are attained by this hill holder for vehicles, a preferred embodiment of which has been illustrated in the accompanying drawings, by way of example only, wherein:

Figure 1 is a perspective view showing the hill holder as operatively installed on a floor board and brake pedal of an automotive vehicle;

Figure 2 is a vertical sectional view as taken along the plane of line 2—2 in Figure 1;

Figure 3 is a vertical sectional view similar to that of Figure 2 but showing the hill holder in an applied position;

Figure 4 is a bottom plan view of the pedal extension which is adapted to be secured to the brake pedal of the automobile; and Figure 5 is a wiring diagram of this invention.

With continuing reference to the accompanying drawings wherein like reference numerals designate similar parts throughout the various views, reference numeral 10 generally designates the floor board of an automotive vehicle which includes brake and clutch pedals 12 and 14 and an accelerator pedal 16. An extension 18 is mounted on the brake pedal 12 by clamp elements 20 and 22 which are clampingly held in engagement with the brake pedal 12 by means of a bolt fastener 24. The clamp elements 20 and 22 are mounted on a shaft 26 extending through the pedal extension 18 and a coil spring 28 provides means for urging the upper portion of the pedal extension 18 upwardly.

The pedal extension 18 is provided with an end portion 30 which has an aperture 32 therethrough, the aperture 32 extending at an angle not perpendicular to the plane of the surface of the pedal extension 18. Suitably secured on the floor board 10 is a casing 34 of suitable configuration. Within the casing on a mounting bracket 36 there is pivotally mounted a locking lever 38 which is continually biased upwardly by means of a spring 40. A stop 42 is carried by the casing 34 for limiting the upward motion of the locking lever 38. A suitable slot or aperture 44 is formed in the casing 34 for reception of a rod 46 which is pivotally attached as at 48 to the locking lever 38. The rod 46 extends upwardly through the aperture 32, the axis of the aperture 32 being at an angle to the longitudinal axis of rod 46 such that said angle will be increased as the extension 18 is tilted forwardly.

The locking lever 38 is provided with a beveled portion 50 forming a cam surface.

Mounted within the casing 34 is an electromagnetic device 52 which includes a coil 54 for actuating a pivotable armature 56 which is continuously biased away from the coil 54 by means of a spring 58. The armature 56 has a triangular shape detent 60 preferably integrally cast therewith which has a cam surface 62 for sliding engagement relative to the cam surface 50 of the locking lever 38. The under surface 64 of the detent 60 is adapted to engage the upper edge of the locking lever 38 when the locking lever is pivoted to the position as can be best seen in Figure 3. A resilient stop 66 is mounted on the floor board 10 within the casing 34 for limiting the downward movement of the locking lever 38.

In normal use of this hill holder the device is in an initial position as is shown in Figures 1 and 2. When brake pressure is applied at the point indicated A for normal braking operation the rod 46 slides freely through the aperture 32 and no locking action takes place. If, however, it is desired to lock the foot brake, pressure is applied at or near point B and the pedal 12 together with the pedal extension 18 is depressed. The pedal extension 18 will be rotated about the shaft 26 until the pedal extension 18 slidably frictionally engages the rod 46 forcing the rod 46 downward and thus pivoting the locking lever 38 downwardly. This will cause the locking lever 38 to become engaged beneath the detent 60 and is held in a locked position in engagement with the under surface 64 of the detent 60. The locking lever 38 can be released only by foot pressure at point A or by pressing the accelerator 16 which will close a switch 68 positioned beneath the accelerator 16 which energizes the coil 54 to urge the armature 56 inwardly against the force of the spring 58. The spring 28 is not of sufficient strength as to store enough energy to overcome the friction of the engagement between the rod 46 and the pedal extension 18.

Hence, during the normal driving of a vehicle equipped with the invention on hilly terrain, when it is necessary to stop the vehicle's travel on a hill it is merely necessary to actuate the hill holder by causing the locking lever 38 to be in engagement with the detent 60. This will cause the brakes to hold until the accelerator 16 is depressed, which will release the brakes while providing power for continuing the forward travel of the vehicle, thus preventing any backward rolling of the vehicle.

Since from the foregoing, the construction and advantages of this hill holder for vehicles are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

1. A hill holder comprising means for selectively locking foot pedal actuated brakes including a tiltably mounted pedal extension adapted to be secured on a brake pedal, an aperture through said pedal extension, a rod extending through said aperture, said aperture having its axis extending at an acute angle with respect to the longitudinal axis of said rod whereby said rod is frictionally engageable with said pedal extension, the axis of said aperture extending at a direction relative to said rod axis such that forward tilting of said pedal extension increases the angle between the rod axis and said axis of said aperture, a locking lever, said rod being pivotally attached to said locking lever, an electromagnetic device including a movable armature, a coil for actuating said armature, a detent on said armature selectively engaging said locking lever, and means for actuating said coil to disengage said detent from said locking lever.

2. A hill holder comprising means for selectively locking foot pedal actuated brakes including a pedal extension adapted to be secured on a brake pedal, an aperture through said pedal extension, a rod extending through said aperture, said aperture having its axis extending at an acute angle with respect to the longitudinal axis of said rod whereby said rod is frictionally engageable with said pedal extension, the axis of said aperture extending at a direction relative to said rod axis such that forward tilting of said pedal extension increases the angle between the rod axis and said axis of said aperture, a locking lever, said rod being pivotally attached to said locking lever, an electromagnetic device including a movable armature, a coil for actuating said armature, a detent on said armature selectively engaging said locking lever, and means for actuating said coil to disengage said detent from said locking lever, and means continuously urging said locking lever upwardly out of engagement with said detent.

3. A hill holder comprising means for selectively locking foot pedal actuated brakes including a pedal extension adapted to be secured on a brake pedal, an aperture through said pedal extension, a rod extending through said aperture, said aperture having its axis extending at an acute angle with respect to the longitudinal axis of said rod whereby said rod is frictionally engageable with said pedal extension, the axis of said aperture extending at a direction relative to said rod axis such that forward tilting of said pedal extension increases the angle between the rod axis and said axis of said aperture, a locking lever, said rod being pivotally attached to said locking lever, an electromagnetic device including a movable armature, a coil for actuating said armature, a detent on said armature selectively engaging said locking lever, and means for actuating said coil to disengage said detent from said locking lever, and means continuously urging said locking lever upwardly out of engagement with said detent, said armature being mounted for pivotal movement, and means continuously urging said armature into a locking position.

4. A hill holder comprising means for selectively locking foot pedal actuated brakes including a pedal extension adapted to be secured on a brake pedal, an aperture through said pedal extension, a rod extending through said aperture, said aperture having its axis extending at an acute angle with respect to the longitudinal axis of said rod whereby said rod is frictionally engageable with said pedal extension, the axis of said aperture extending at a direction relative to said rod axis such that forward tilting of said pedal extension increases the angle between the rod axis and said axis of said aperture, a locking lever, said rod being pivotally attached to said locking lever, and means for selectively locking said locking lever in a lowered position to hold said brake pedal in an actuated position.

5. A hill holder comprising means for selectively locking foot pedal actuated brakes including a pedal extension adapted to be secured on a brake pedal, an aperture through said pedal extension, a rod extending through said aperture, said aperture having its axis extending at an acute angle with respect to the longitudinal axis of said rod whereby said rod is frictionally engageable with said pedal extension, the axis of said aperture extending at a direction relative to said rod axis such that forward tilting of said pedal extension increases the angle between the rod axis and said axis of said aperture, a locking lever, said rod being pivotally attached to said locking lever, an electromagnetic device including a movable armature, a coil for actuating said armature, a detent on said armature selectively engaging said locking lever, and means for actuating said coil to disengage said detent from said locking lever.

References Cited in the file of this patent

UNITED STATES PATENTS

| | | |
|---|---|---|
| Re. 20,733 | Barrett et al. | May 24, 1938 |
| 1,967,151 | Lustick | July 17, 1934 |
| 1,972,300 | Hemingway | Sept. 4, 1934 |
| 1,976,471 | Adams | Oct. 9, 1934 |
| 2,389,199 | Laird | Nov. 20, 1945 |
| 2,553,448 | Frauen | May 15, 1951 |